Patented Mar. 18, 1947

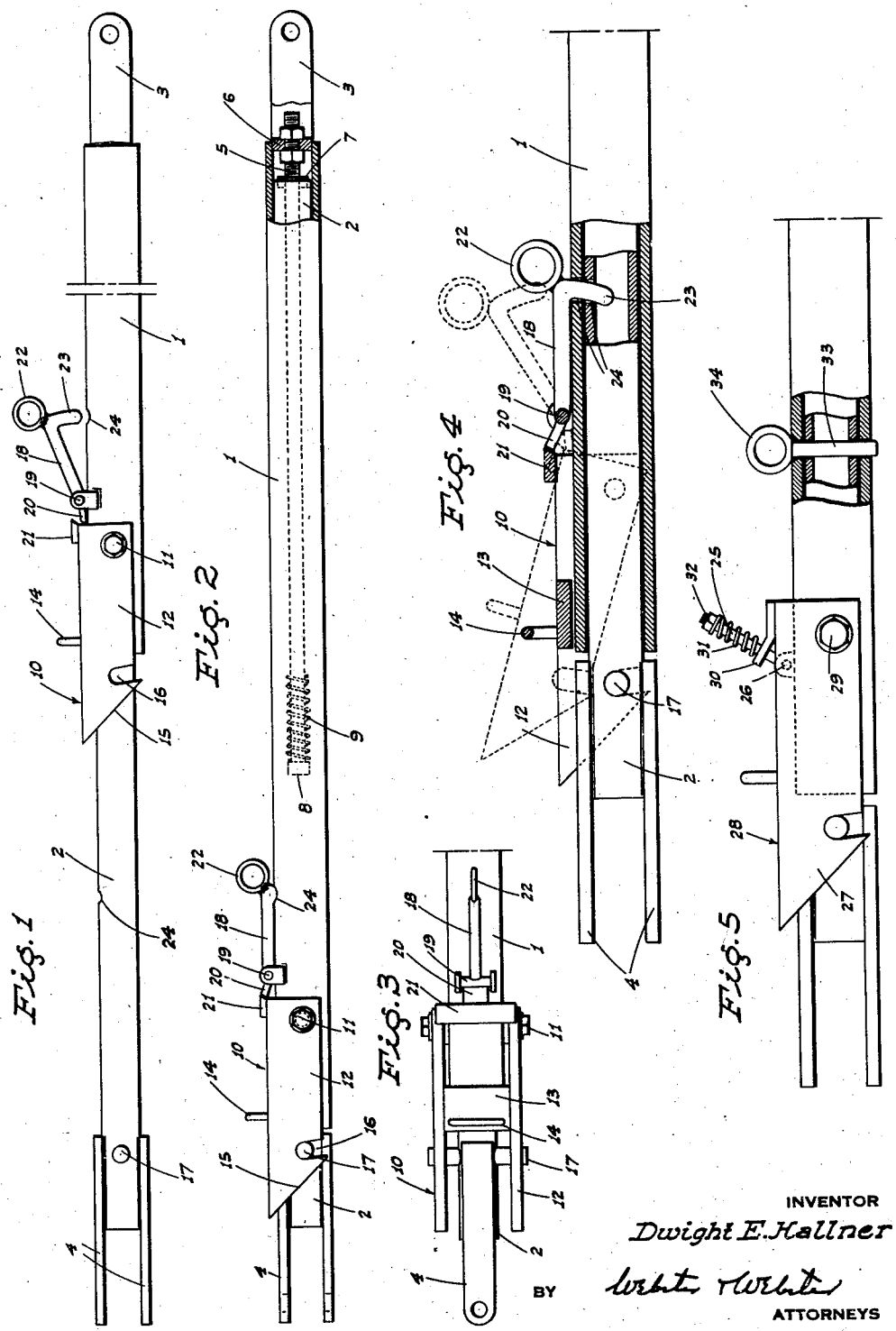

2,417,646

UNITED STATES PATENT OFFICE 2,417,646

DRAWBAR UNIT

Dwight E. Hallner, Merced County, Calif.

Application November 21, 1945, Serial No. 630,007

7 Claims. (Cl. 280—33.14)

This invention is directed to, and it is an object to provide, a novel drawbar unit adapted to couple a motor vehicle, such as a truck or tractor, to a trailing wagon, implement, or the like.

Another object of the invention is to provide a sectional drawbar unit wherein the sections are normally latched, but releasable for manual extension, so as to facilitate coupling of said drawbar unit between the motor vehicle and the trailing implement even though the spacing between the same may be initially somewhat greater than the length of said unit when in the normally contracted and latched position thereof.

A further object of the present invention is to provide a drawbar unit, as above, which includes a novel latch operative to normally and effectively secure the separate telescopic sections of the drawbar unit in contracted position; there being a safety device, shown in different embodiments, arranged to prevent accidental release of the latch when the drawbar unit is in use.

An additional object is to provide a shock absorbing and limiting device which prevents relative extension of the telescopic sections of the drawbar unit beyond a predetermined point.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 1 is a side elevation of the novel drawbar unit as extended.

Figure 2 is a similar view, partly broken away, of the drawbar unit in its normally contracted and latched position for use.

Figure 3 is a fragmentary plan view of the latch and associated safety device.

Figure 4 is an enlarged fragmentary sectional elevation illustrating the cooperative arrangement of the latch and said safety device.

Figure 5 is a fragmentary side elevation showing a modified type of safety device in connection with the latch.

Referring now more particularly to the characters of reference on the drawings, and at present to Figs. 1-4 inclusive, the drawbar unit includes an outer tubular bar section 1 and an inner tubular bar section 2 engaged together in relatively close running telescopic relation. At its free end the tubular bar section 1 is fitted with a clevis 3, and the tubular bar section 2 is likewise fitted, at its free end, with a clevis 4; the transverse axes of said clevises being disposed at right angles to each other.

A limit rod 5 is fixed, at its outer end, in connection with a collar 6 rigidly secured in the free end of the tubular section 1; said limit rod 5 being disposed within the tubular bar section 1 and extending from the collar 6 into the adjacent portion of the tubular bar section 2 through a guide collar 7 in the adjacent end of the latter. At its inner end the limit rod 5 is formed with a stop head 8, and a relatively short shock absorbing spring 9 surrounds said rod adjacent the head 8. The limit rod 5 is of substantial length whereby to permit of extension of the telescopic bar sections 1 and 2 to a substantial extent. However, the described limit rod arrangement functions effectively to prevent separation of the bar sections 1 and 2.

The bar sections 1 and 2 are normally contracted and maintained in such position by means of the following latch arrangement:

An elongated saddle-shaped latch, indicated generally at 10, straddles the inner end portion of the tubular bar section 1 and projects some distance therebeyond; said saddle shaped latch being pivoted, adjacent its inner end, to the bar section 1, as at 11, for vertical swinging movement from a longitudinally projecting position, as shown in full lines in Fig. 4, to an upwardly inclined, release position, as shown in dotted lines in said figure.

The saddle shaped latch 10 includes transversely spaced side plates 12 connected together at the top by a cross plate 13, and a handle 14 upstands from said cross plate 13.

The outer or leading ends of the side plates 12 are formed as bevel cams 15, and directly to the rear of said cams the side plates 12 are formed with a pair of transversely matching, downwardly opening notches 16.

Adjacent the clevis 4, the bar section 2 is fitted with a cross pin 17, which projects laterally on opposite sides of said bar section. When the bar sections 1 and 2 are telescoped from an extended position, as in Fig. 1, to the contracted position shown in Fig. 2, the bevel cams 15 engage opposite ends of the cross pin 17, causing the saddle shaped latch 10 to swing upwardly about the pivotal axis 11, and thereafter with a slight further contraction the latch drops and the ends of the cross pin 17 enter the notches 16, thus latching the sections 1 and 2 against extension.

When the described drawbar unit is in use it is coupled at one end to the front of the trailing implement by means of the corresponding clevis, and thereafter the latch 10 is released and the drawbar unit extended somewhat. The motor vehicle, such as a tractor, is then backed toward the opposite end of the drawbar and stopped reasonably close thereto.

However, the exact position of the motor vehicle is not critical, and coupling of the clevis of the adjacent end of the drawbar unit to said motor vehicle can be readily accomplished by merely manually extending or contracting said unit to the extent necessary.

When the drawbar unit is thus coupled between the motor vehicle and the trailing implement, the operator backs said motor vehicle to cause contraction of the drawbar unit until the latch 10 rides over and engages with the cross pin 17 in the manner previously described. Thereafter the drawbar unit is latched against extension and is ready for use.

In order to prevent accidental release of the latch 10 from the lugs 17 when the drawbar unit is in use, I provide certain safety devices, one form of which is included in Figs. 1–4 inclusive, and comprises the following:

A longitudinally extending locking arm 18 is disposed on top of the bar section 1 adjacent but to the rear of the latch 10, and adjacent said latch the locking arm 18 is secured to a cross pivot 19 having an upwardly inclined stop 20 fixed thereon. The locking arm 18 normally lies parallel against the bar section 1, and in this position the stop 20 inclines upwardly and engages a cross block 21 on top and at the rear of the latch 10. By reason of this arrangement the latch 10 cannot swing upwardly to released position until the locking arm 18 is first raised so as to lower the stop 20 to an inoperative position clear of the cross block 21. Raising of the locking arm 18 is accomplished manually through the medium of an eye 22 thereon.

When the locking arm 18 is in its normally lowered or locking position, with the latch 10 likewise in a similar position, a depending dog 23 on said arm 18 projects through a pair of adjacent registering openings 24 in the bar sections 1 and 2, whereby to further releasably lock the same against relative longitudinal movement. Thus, to unlatch the drawbar unit for extension it is necessary to first pull upwardly on the eye 22, and to then raise the latch 10 by the handle 14.

In Figure 5 there is illustrated a modification of the safety device which prevents accidental opening of the latch 10.

This modification comprises a rod 25 pivoted at its lower end, as at 26, to the bar section 1 between the side plates 27 of the saddle-shaped latch 28 ahead of the pivotal axis 29 thereof. The rod 25 extends at an upward and rearward incline relative to the free end of the latch 28 and slidably projects through an ear 30 on said latch at the top. A compression spring 31 engages between the ear 30 and an end nut on said rod. The spring 31 thus normally acts to swing the latch 28 downwardly about its pivotal axis 29, whereby to maintain said latch against accidental release. In this embodiment the tubular sections 1 and 2 are normally further locked against accidental extension, when the latch 28 is in holding position, by means of a locking pin 33, fitted at its upper end with an eye 34, and which locking pin removably extends through registering openings in said bar sections. In this embodiment the bar sections 1 and 2 are released for extension by withdrawing the locking pin 33 and manually raising the latch 28 against the compression of spring 31.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as set forth herein.

Having thus described the invention, the following is claimed as new and useful, and upon which Letters Patent are desired:

1. A drawbar unit comprising a pair of telescopic bar sections having hitch elements on the free ends thereof, a saddle-shaped latch straddling one bar section from above adjacent and projecting beyond the inner end thereof, means transversely pivoting said latch to said one bar section for upward vertical swinging from a normally lowered position, lugs projecting laterally in opposite directions from the other bar section adjacent its free end, the latch being downwardly notched at opposite sides and the lugs normally engaging in the notches when the bar sections are in predetermined telescopic relation.

2. A drawbar unit comprising a pair of telescopic bar sections having hitch elements on the free ends thereof, a saddle-shaped latch straddling one bar section from above adjacent and projecting beyond the inner end thereof, means transversely pivoting said latch to said one bar section for upward vertical swinging from a normally lowered position, lugs projecting laterally in opposite directions from the other bar section adjacent its free end, the latch being downwardly notched at opposite sides and the lugs normally engaging in the notches when the bar sections are in predetermined telescopic relation; the free ends of the sides of the saddle-shaped latch being formed as cams inclined downwardly and toward said notches so that upon contracting of the drawbar unit to said predetermined telescopic relation, the cams ride the lugs to raise the latch to permit the pin to engage in said notches.

3. A drawbar unit comprising a pair of telescopic bar sections having hitch elements on the free ends thereof, a saddle-shaped latch straddling one bar section from above adjacent and projecting beyond the inner end thereof, means transversely pivoting said latch to said one bar section for upward vertical swinging from a normally lowered position, lugs projecting laterally in opposite directions from the other bar section adjacent its free end, the latch being downwardly notched at opposite sides and the lugs normally engaging in the notches when the bar sections are in predetermined telescopic relation; there being a longitudinal locking arm on top of said one bar section extending toward and to a point adjacent the inner end of the latch, means transversely pivoting the locking arm at the end adjacent the latch for upward swinging motion, a stop inclined upwardly from the pivoted end of the arm toward the top of the adjacent end of the latch, and a cross block on the latch which said stop normally engages in a manner to prevent release of said latch, upward swinging of said arm freeing the stop from the cross block.

4. A drawbar unit as in claim 3 in which said arm includes a depending dog; the latter normally engaging through openings in the telescoped bar sections which register when said sections are in said predetermined relation and the latch is in its normally latched position.

5. A drawbar unit comprising a pair of telescopic bar sections having hitch elements on the free ends thereof, a saddle-shaped latch straddling one bar section from above adjacent and projecting beyond the inner end thereof, means transversely pivoting said latch to said one bar section for upward vertical swinging from a normally lowered position, lugs projecting laterally in opposite directions from the other bar section adjacent its free end, the latch being downwardly notched at opposite sides and the lugs normally engaging in the notches when the bar sections are in predetermined telescopic relation; there being a spring means normally but yieldably maintaining the latch against movement in a direction to release from the lugs.

6. A drawbar unit as in claim 5 in which said spring means comprises an upstanding rod on said one bar section between the sides of the latch, a member on the latch through which the rod slidably extends, a head on the rod, and a loaded compression spring between said head and member.

7. A drawbar unit comprising a pair of telescopic bar sections having hitch elements on the free ends thereof, a saddle-shaped latch straddling one bar section from above adjacent and projecting beyond the inner end thereof, means transversely pivoting said latch to said one bar section for upward vertical swinging from a normally lowered position, lugs projecting laterally in opposite directions from the other bar section adjacent its free end, the latch being downwardly notched at opposite sides and the lugs normally engaging in the notches when the bar sections are in predetermined telescopic relation; there being a spring normally but yieldably maintaining the latch against movement in a direction to release from the lugs, and a removable locking pin normally engaged through openings in the bar sections which register when the sections are in said predetermined telescopic relation and the latch is in its normally latched position.

DWIGHT E. HALLNER.

REFERENCES CITED

The following references are of record in the file of this patent:

UNITED STATES PATENTS

| Number | Name | Date |
| --- | --- | --- |
| 2,179,439 | Trow | Nov. 7, 1939 |
| 2,292,751 | Forney | Aug. 11, 1942 |
| 2,384,244 | Forney | Sept. 4, 1945 |
| 1,296,105 | Navratil | Mar. 4, 1919 |
| 2,366,294 | Stringer | Jan. 2, 1945 |